United States Patent [19]

Seol

[11] Patent Number: 4,762,332

[45] Date of Patent: Aug. 9, 1988

[54] WHEEL CHAIR

[75] Inventor: Marn T. Seol, Rochester, N.Y.

[73] Assignee: Byung D. Yim, Rochester, N.Y.

[21] Appl. No.: 875,135

[22] Filed: Jun. 17, 1986

[51] Int. Cl.[4] .......................... B62M 1/04; B62M 1/14

[52] U.S. Cl. .............................. 280/242 WC; 74/138; 74/142; 74/833; 192/28; 192/47; 192/64; 280/236; 280/244; 280/246; 280/253; 280/255; 280/258

[58] Field of Search ............... 280/246, 244, 247, 248, 280/242 WC, 236, 242 R, 253, 255, 256, 257, 258; 74/138, 142, 833; 192/28, 64, 47

[56] References Cited

U.S. PATENT DOCUMENTS

| | | | |
|---|---|---|---|
| 1,429,196 | 9/1922 | Dughera | 192/64 |
| 3,084,774 | 4/1963 | Liang | 192/47 |
| 4,272,096 | 6/1981 | Efros | 280/255 |
| 4,358,126 | 11/1982 | Mitchell et al. | 280/242 WC |
| 4,421,334 | 12/1983 | Efros | 280/255 X |
| 4,453,729 | 6/1984 | Lucken | 280/253 |
| 4,506,900 | 3/1985 | Korosue | 280/242 WC |
| 4,574,649 | 3/1986 | Seol | 280/255 X |

FOREIGN PATENT DOCUMENTS

| | | | |
|---|---|---|---|
| 656119 | 1/1938 | Fed. Rep. of Germany | 192/64 |
| 334605 | 2/1960 | France | 192/64 |
| 1224650 | 2/1960 | France | 192/64 |
| 398145 | 12/1933 | United Kingdom | 192/64 |

*Primary Examiner*—John J. Love
*Assistant Examiner*—Mitchell J. Hill
*Attorney, Agent, or Firm*—Martin Lukacher

[57] ABSTRACT

A wheelchair having a propulsion and speed change mechanism, the mechanism has a clutch with a cam clutch (21) and a cylindrical fly wheel (23) installed on a hub (24) of the shaft (25) of the main wheel of the chair. The clutch includes roller bearings (14), plate springs (22) and forward and backward regulating device (15). A matched union gear (20) is formed at the center of the cam clutch (21) and matched with a union gear (19) formed on a propulsion and speed change bar (12) so that the cam clutch (21) and the propulsion and speed change bar move as one body. The cam clutch (21) and the bar (12) are installed with a bearing (17) on the axle of the frame (13) of the wheelchair. A connecting rod (2) has one end connected to one of a plurality of holes (10) on the propulsion and speed change bar (12) with a fixing pin. The other end of the rod is connected to the hole (7) of the propulsion and speed change bar with a moveable pin (6). A forward and backward selector (4) is connected to the forward and backward regulating device with a wire.

12 Claims, 6 Drawing Sheets

WHEEL CHAIR

DESCRIPTION

1. Field of the Invention

This invention relates to wheel chairs, and especially wheel chairs equipped with propulsion and speed change devices which can be operated manually by the user.

2. Background of the Invention

In conventional wheel chairs, the user revolves a circle (circular rim) attached to the wheel using his hands to move the wheel chair, or a guardian or a third person pushes or pulls the wheel chair in the back, or the user drives the wheel chair manually when it is equipped with an engine. Among these, the wheel chair operated by revolving the wheel with hands charges a significant burden to the patient or the user, and it is very difficult to operate on an inclined route. The wheel chair operated by pushing or pulling in the back can be operated only when a guardian or a third person is available. It is also difficult to operate in an inclined route and also is especially burdensome during a turn to the guardian or the third person. The wheel chair equipped with an engine may not require an unreasonable physical action of the user, but imposes an economical burden to the user and is very inappropriate to use in a limited space such as inside a building because of the exhaust gas. The engine noise is another problem to use it indoors.

Since a person who has to use a wheel chair is most likely one who cannot use the lower half of his body and sometimes who is not in a good physical condition, the amount of work such as operating a wheel chair by revolving the wheels directly with hands over long distances is a severe burden to the user. Therefore, it has been very desirable to equip a propulsion device in the wheel chair of the type used in a bicycle. However, there are many restrictions in the wheel chairs as already mentioned above: first, the device should be able to operate even in an indoor space; second, it should be able to be operated even on a somewhat inclined route; and third, it should not require too much strength to use; and fourth, it should be simple to operate. Especially, the safety should be considered as the first priority.

SUMMARY OF THE INVENTION

This invention offers a new wheel chair which fulfills the above requirements and at the same time overcomes the disadvantages of the conventional wheel chairs. The new wheel chair is equipped with a new convenient and powerful propulsion device and is designed to have much improved mobility and usefulness of the wheel chair. A fly-wheel is installed on the axle of the main wheel and a propulsion lever is installed on the handle area of the wheel chair. Clutch means is provided in the form of a cam clutch which is connected to and moved with a propulsion bar located inside the fly-wheel. The cam clutch and the fly-wheel can be moved separately. The cam clutch has a clutching means rotatable within the fly wheel about the axis of the axle. A coupling member in the form of a roller is disposed within hollows in the clutching member over or between a spring. The roller is selectively movable circumferentially in opposite directions between opposite, inclined sides of the hollow to provide clutching engagement between the clutching member and the fly-wheel so as to enable the fly-wheel to be rotated in opposite directions. The chair can then be driven forwardly or in reverse. The propulsion lever on the handle and the propulsion bar attached to the cam clutch is connected by a connecting rod. When a user pushes or pulls the propulsion lever on the handle in forward or backward direction, the cam clutch connected to the propulsion lever through the connecting rod and the propulsion bar is rotated and the rotating power of the cam clutch is transmitted to the fly-wheel which in turn transmits its force to the main wheel. A speed change device is furnished inside the propulsion lever and speed change control holes are in the propulsion bar. The speed change mechanism is designed in such a way that the user can change the speed very easily dependent upon his strength.

DESCRIPTION OF THE PREFERRED EMBODIMENT

Figure 2:
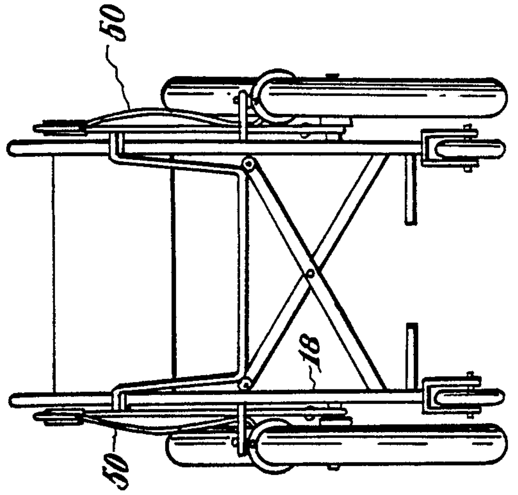
FIG. 2 is a front view of the wheel chair shown in FIG. 1.
Figure 1:
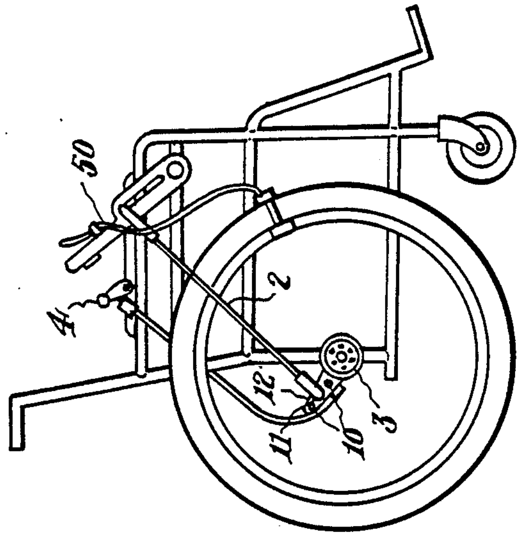
FIG. 1 is a side view illustrating a wheel chair equipped with a propulsion and speed change mechanism embodying the invention.

Referring to FIGS. 1–6 of the drawings there is shown a propulsion and speed change lever pivoted on the frame of the wheel chair to make a push and pull motion. The propulsion and speed change lever 1 is connected by a connecting rod 2 to a propulsion device 3 installed on the axle of the wheel in the frame. A forward and backward selector 4 is also attached on the frame of the wheel chair and a connecting wire from it is stretched to the propulsion device 3. A well-known brake device 50 is installed between the propulsion and speed change lever 1 and the wheel of the wheel chair. The propulsion and speed change lever 1 is operated manually and is also called a propulsion lever.

It can be noticed from FIG. 2 that the right and left wheels are not connected with each other in order to be moved separately and all the equipments are furnished in right-left symmetrical fashion. This means that the wheel chair embodying the invention can be used by folding it very conveniently just like the conventional wheel chair.

In the propulsion and speed change mechanism of the wheel chair (see especially FIG. 3), the propulsion and speed change lever 1 is illustrated together with a perspective side view of the propulsion device 3. One end of the connecting rod 2 is connected to the propulsion and speed change bar 12 with a fixing pin 11 and the other end is connected to the propulsion lever 1 via a moving pin 6. The propulsion device 3 includes a clutch means which is of a new noiseless type. Speed change adjustment holes 10 in the propulsion and speed change bar 12 adjust the range of speed change semi-permanently. The example in the drawing shows only three holes, but more or less can be used. One end of the connecting rod 2 is fixed semi-permanently to one of the speed change adjustment holes 10 dependent upon who uses the wheel chair. If the outer-most hole among the speed change adjustment holes 10 is connected to the connecting rod 2, the speed is slower but the wheel chair can be operated even with lower power and thus becomes more suitable to women, children, or older users. If the inner-most hole is connected to the connecting rod 2, the speed is faster but more power is required and thus it is suitable to strong male users.

Figure 3:
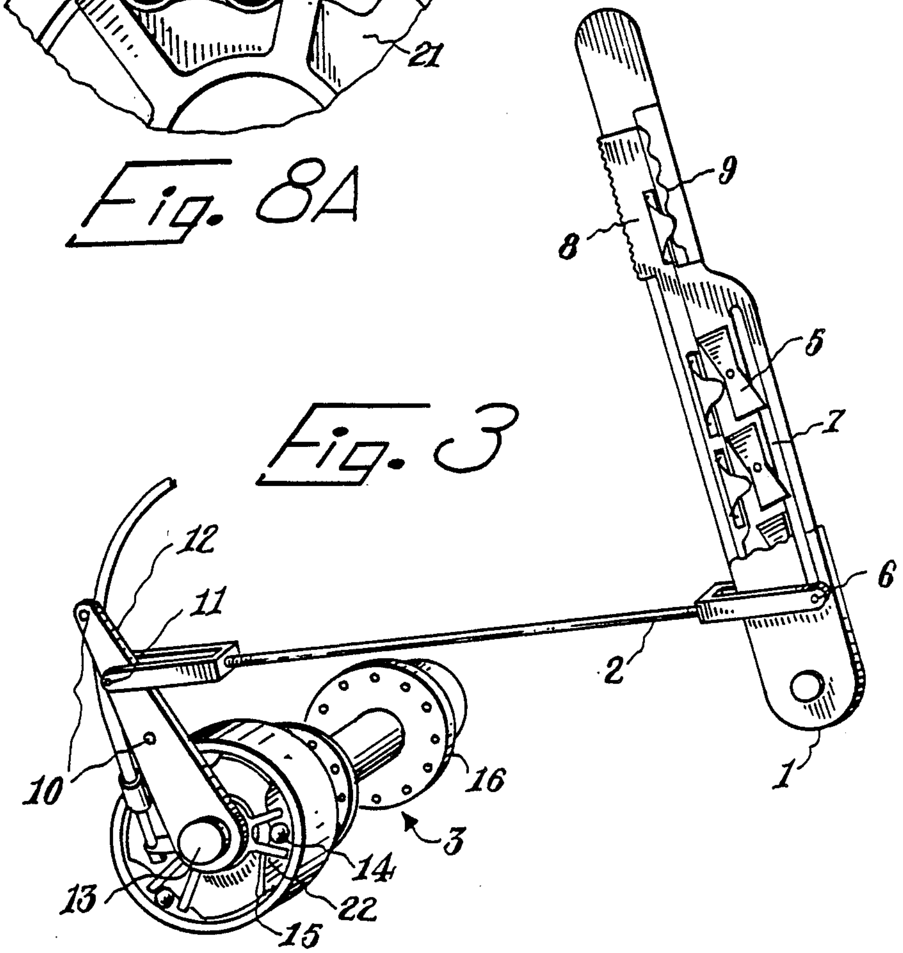
FIG. 3 is a diagrammatic perspective view partially broken away to illustrate the propulsion and speed change mechanism used on the wheel chair shown in FIG. 1, in greater detail.
Figure 5A:
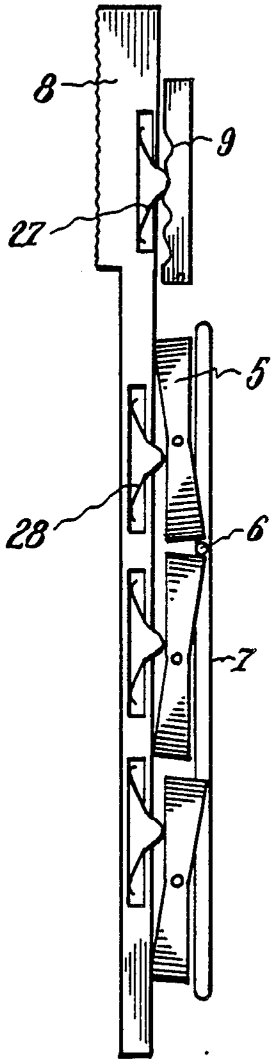
FIG. 5 shows, in views (*a*) and (*b*), schematic views illustrating the operation of the speed change device provided in accordance with an embodiment of the invention.

The speed change mechanism of the propulsion and speed change lever 1 is best seen in FIGS. 3 and 5A and B. Part 8 is a speed change control handle. Part 9 is a speed change control notch. Parts 5 are pawls, which act as stops for the pin 6 and adjust the length and change the speeds. Part 7 is an elongated hole or slot for the moving pin 6. Part 13 is the frame axle. Part 16 is the wheel axle. Part 15 is a motion (direction) selection member, called a forward and backward (reverse direction) controller or regulating device. Parts 14 are coupling members provided by roller bearings. The forward and backward regulating device 15 is connected with a wire to the forward and backward selector 4 shown in FIG. 1.

Figure 4:
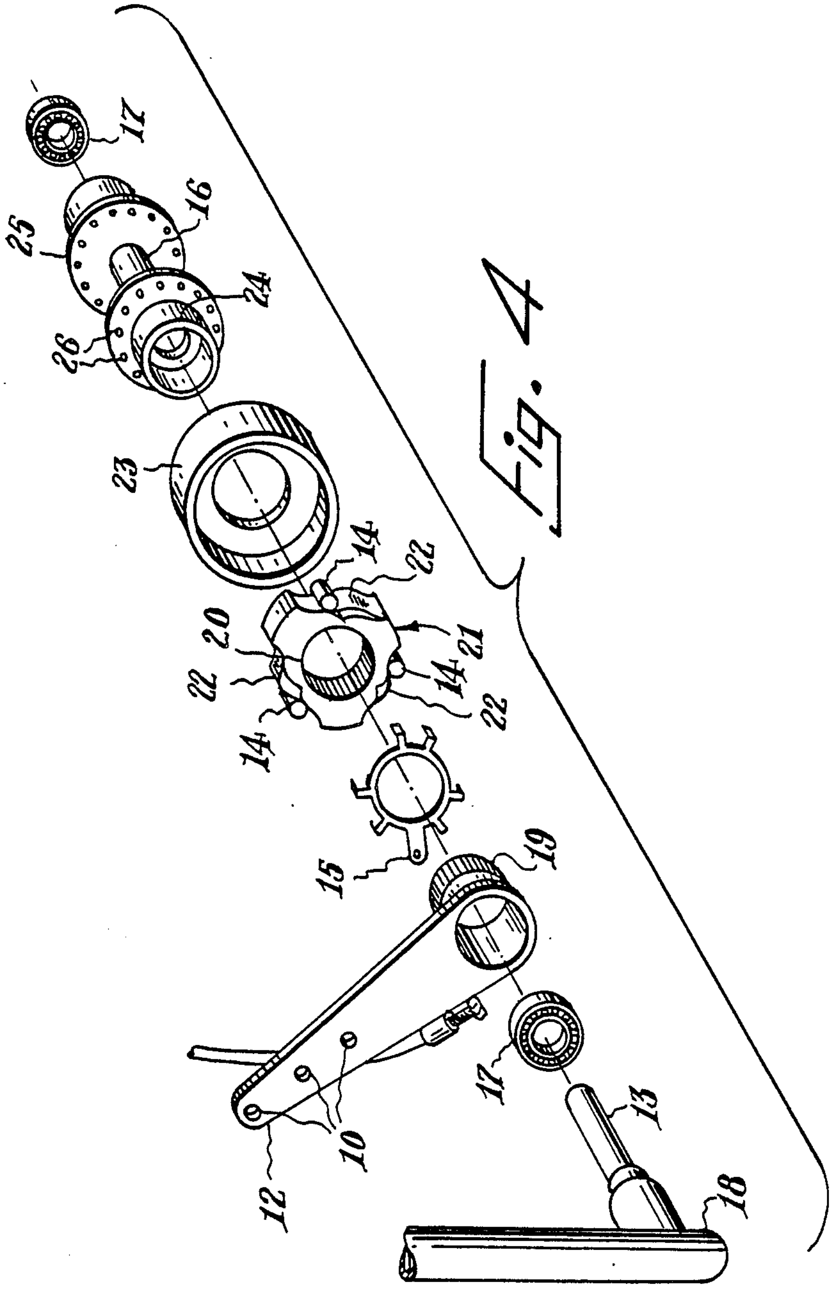
FIG. 4 is an exploded view illustrating the hub assembly including a fly-wheel and a cam clutch used on the wheel chair embodying the invention.

An exploded view of the propulsion device or assembly 3 is shown in FIG. 4. A bearing 17 and a union gear 19 are assembled (formed as one body) on the propulsion and speed change bar 12, the forward and backward regulating device 15, a cam clutch or clutching member 21 which acts as a drive member, a matched union gear 20 which corresponds and is in engagement with the union gear 19. Roller bearings 14 are located in the hollows formed on the surface of the clutch 21. A fly-wheel 23 acts as a driven member and is arranged to be assembled between the end of the axle 13 and a hub 23 on the wheel shaft 25. The bearing 17 on the left in FIG. 4 is directly combined with the axle 13 and lets the union gear 19 move freely around the axle. The forward and backward regulating device 15 consists of a ring with three pairs of arms, and the roller bearings 14 are inserted inbetween each pair of the arms. The cam clutch 21 moves, as one body, with the propulsion and speed change bar 12 and can be turned freely around the frame axle 13 about the left bearing 17. The outside diameter of the cam clutch 21 is a little smaller than the inside diameter of the fly-wheel 23. The mutual operating relationship between the clutch 21, the fly-wheel 23, the roller bearings 14, the spring plate 22, and the forward and backward regulating device 15 will be explained below. A union screw joint in the fly-wheel 23 is engaged with a matched union screw joint formed on the hub 24 of the wheel shaft 25. The fly-wheel 23 can be turned as one body with the wheel shaft 25. A spoke hole 26 for the spokes (not shown) connected to the fly-wheel 23 are located on the flange and on the hub 24. The wheel shaft 25 rotates freely around the frame axle 13 because of right side bearing 17.

In operation, upon the user pushing or pulling action of the of the propulsion lever 1, the connecting rod 2 connected to the lever 1 makes the propulsion and speed change bar 12 turn around the frame axle 13. Accordingly, the cam clutch 21 combined with the propulsion and speed change bar 12 rotates as one body, and via the union gear 19 and the matched union gear 20 rotates the clutch member 21. Since the diameter of the cam clutch 21 is slightly smaller than the inside diameter of the fly-wheel 23, the cam clutch rotates freely. The roller bearings 14 are in hollows of the cam clutch 21. The hollows have sides inclined in opposite directions toward the center thereof the rollers are pushed by arms of a regulating device 15 to the one side or the other of the hollow and plays a role of a wedge between the cam clutch 21 and the fly-wheel 23.

Thus, the rotating power of the cam clutch 21 is transmitted to the fly-wheel 23. If the propulsion lever 1 is pushed or pulled to the opposite direction of the above mentioned movement, the rotating direction of the propulsion and speed change bar 12 is opposite to the above mentioned direction and the roller bearing 14 falls out from the inclined hollow, then the cam clutch 21 is rotated free from the fly-wheel 23. Therefore as long as the roller bearing 14 stays in one side of the hollow inclined in both directions as explained in the above, the propulsion power generated by the movement of the propulsion lever 1 can be transmitted to the fly-wheel 23 as a rotating power of only one direction. However, if the roller bearing 14 is moving back and forth from one side to the other side of the hollow inclined in both directions, no actual propulsion will take place. The wheel will move forward upon pushing and backward upon pulling of the propulsion lever 1, then forward movement will not be realized. Therefore, it is necessary to keep the roller bearing 14 in one side of the inclined hollow. The plate spring 22 is placed on the center of the hollow inclined in both direction and the roller bearing 14 is pressed to stay in one side of the hollow. On the other hand, the moving direction of the wheel (forward or reverse) can be changed by simple change of the position of the roller bearing 14 from one side to the other side of the inclined hollow. The forward and backward regulating device 15 has three pairs of bent arms and the roller bearing 14 or confined between the arms in order to regulate the omvement of the roller bearing 14 at the user's option. The distance between the arms is set as such a distance between the positions of the roller bearing's acting and not acting as a wedge.

Figure 5B:
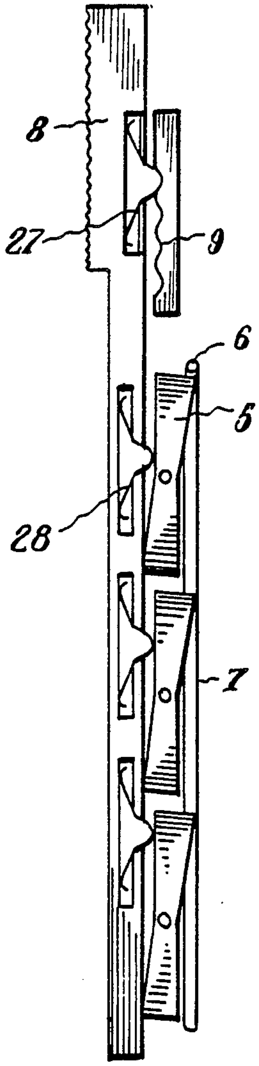

The operation of the speed change mechanism of the propulsion and speed change lever 1 will be seen from FIGS. 5A&B. FIG. 5A shows the first gear position and the FIG. 5B shows the second gear position. The speed change control notches 9 and the rectangular hole or slot 7 for the moving pin 6 are shown in different positions in FIGS. 5A&B. There are first, second, and third butterfly shaped pawls 5 or stops pivotally mounted in the lever 1. The speed change control handle 8 is inside the lever 1 and moves freely as a separate piece. The handle 8 is equipped firmly with a plate spring 27 matched interengaged with the speed change control notches 9. There are first, second, and third plate springs 28 bearing against and pressing on the pawls 5. In the FIG. 5A, the first plate spring 28 which is the nearest to the plate spring 27 is pressing the first pawl 5 clockwise on the pivotal center of the pawl. The second and the thrid plate springs are also pressing clockwise the second and the third pawls, respectively. Thus, the moving pin 6 which connects the connecting rod 2 to the lever 1 can be moved toward the plate spring 27 but not to the opposite direction since it is stopped by the first pawl.

Upon the user's pushing or pulling action of the propulsion lever 1, the moving pin 6 slides down to the end of the hole 7 toward the plate spring 27, but the backward movement of the pin 6 is prevented by the first pawl. At this time, the propulsion power of the lever 1 is transmitted to the connecting rod 2 most strongly.

FIG. 5B illustrates the second gear position, in which the speed change control handle 8 is moved down one step to have the plate spring 27 stay at the second notch. In this position, the first plate spring 28 is pressing the first pawl counter-clockwise, but the second and the third plate springs 28, are still pressing the second and the third pawls 5 clockwise. As a result, the movement of the moving pin 6 along the slot 7 is limited (stopped) at the second pawl in both directions. One end of the first pawl and the other end of the second pawl prevent the movement of the moving pin 6. At this time, the distance between the moving pin 6 and the axle of the lever 1 is limited to a distance from the position inbetween the first and second pawls to the axle of the lever 1, so that the motion of the lever 1 is transmitted over a shorter lever arm length than in the case shown in FIGS. 5A and B, the case of the FIG. 5A results in greater ovement are requires more strength from the user, in the case of FIG. 5B there is less movement, requiring less strength from the user.

The speed changes by the third and fourth gear positions are achieved in the similar fashion. In the third gear position, the first and second pawls are pressed counter-clockwise and only the third pawl is pressed clockwise. So, the moving pin 6 is caught inbetween the second and the third pawl. In the fourth gear position, all of the pawls are pressed counter-clockwise and thus the moving pin 6 is limited between the third pawl and the end of the hole 7.

Figure 6:
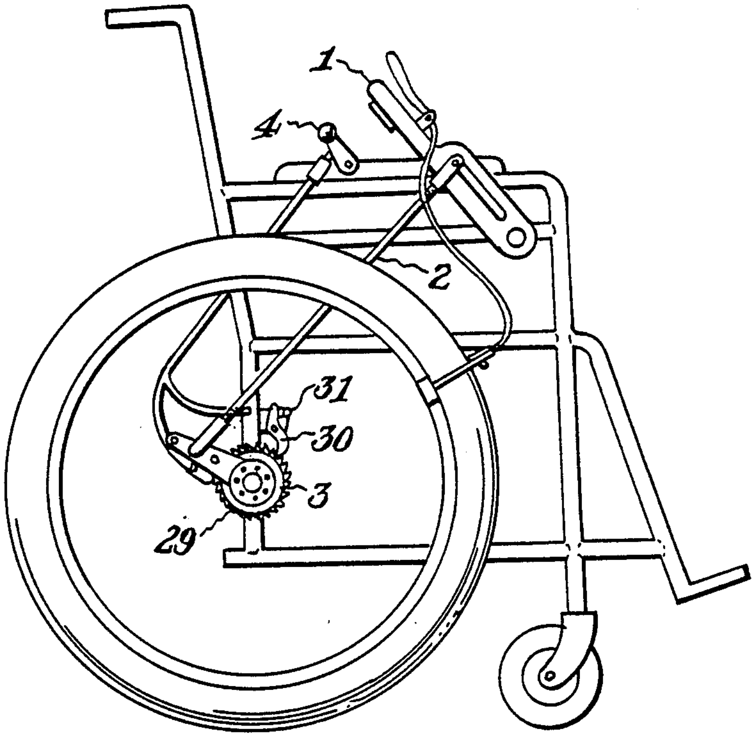
FIG. 6 is a side view of a wheel chair which illustrates another example of the invention.

Referring to FIG. 6 there is shown another embodiment of the wheel chair. A ratchet 29 is installed on the fly-wheel 23 and a pawl 30 is engaged by the ratchet 29. The other end of the pawl 30 is equipped with a stop 31. The backward movement by the weight of the wheel chair itself, as when on an uphill can be prevented. The pawl 30 is connected through a wire to the forward and backward selector 4, and is separated out from the ratchet 29 when backward movement is desired. Thus, during the forward movement, the backward movement is prevented automatically. Although it is unnecessary on a flat road, it helps a great deal on an uphill road (up to about 30° gradient) and upward movement can be made much easily without backward movement due to the weight of the wheel chair itself. On a downhill, the speed control can be readily achieved by using the brake attached on the lever 1.

Figure 8B:
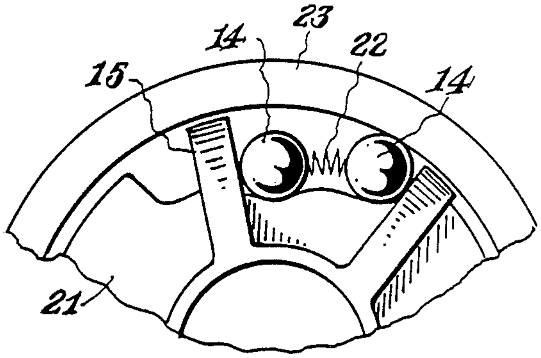
FIGS. 8A and B are fragmentary diagrammatic views illustrating the operation of the clutching means shown in FIG. 7.
Figure 8A:
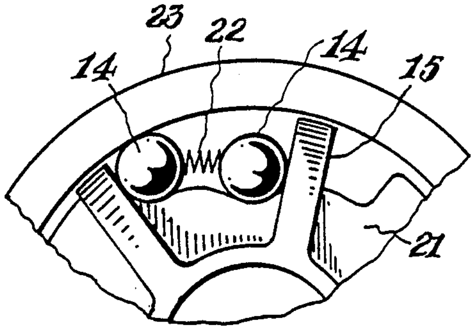
Figure 7:
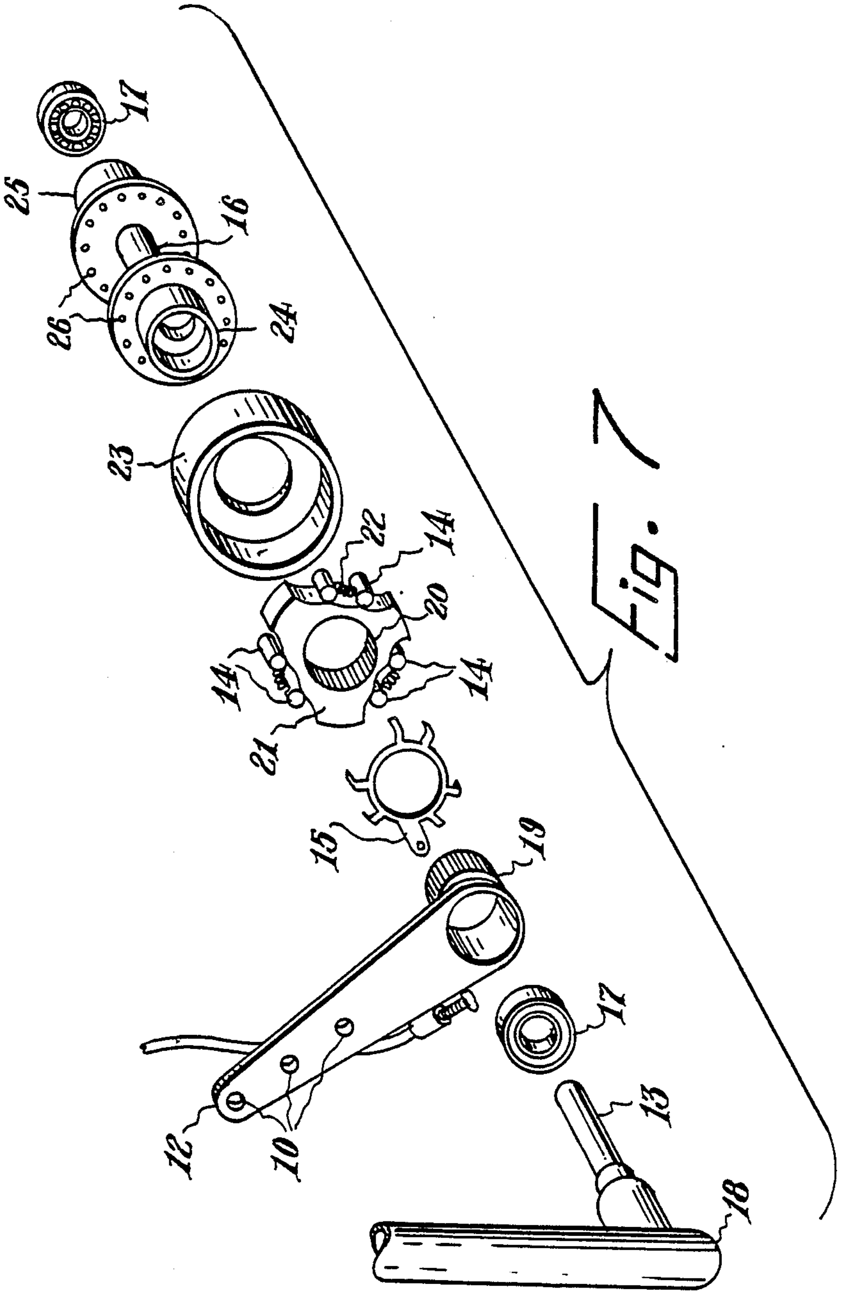
FIG. 7 is a view similar to FIG. 4 of another example of the clutching means provided by another fly-wheel and cam clutch assembly.

Referring to FIGS. 7, 8A&B, instead of roller bearings 14 and plate springs 22 there are, in each of the hollows on the cam clutch 21, two roller bearings 14 separated by a coil spring 2. These two roller bearings 14 are confined between a pair of arms of the forward and backward regulating device 15. The forward and backward movements are interchangeable rather easily and smoothly. For the forward movement, the two rollers are located at the left side of the hollow by the forward and backward regulating device 15 so that the left side bearing 14, acts as a wedge between the fly-wheel 23 and the cam clutch 21, while the right side roller bearing stays loose. For the backward movement, the two rollers are located at the right side of the hollow by the regulating device 15 so that the right side roller bearing 14 acts now as a wedge while the left side roller bearing stays loose.

As described in the above, the wheel chair embodying the invention overcomes all the disadvantages of the conventional wheel chairs. In addition, its effectiveness is so great as judged in terms of easy upward movement on an uphill, easiness to use, readily being controlled by user's option, etc. It is to be understood that many modifications and alternatives can be made by a skilled person in the field without changing the general principles as outlined herein, and such modifications and alternatives are considered to be within the spirit and scope of the invention.

What is claimed is:

1. A wheel chair equipped with a propulsion and speed change mechanism comprising a propulsion and speed change lever 1 having an elongated hole 7, a plurality of movable stops 5 selectively spaced from each other along said hole 7, a frame 18 with an axle 13 having a main wheel with a main wheel shaft 25, a hub 24 on said shaft 25, such shaft and hub being rotably mounted on said axle, a cylindrical fly-wheel 23 installed on the hub 24 of the wheel shaft 25 of the main wheel, a cam clutch 21, roller bearings 14, plate springs 22, said cam clutch having a plurality of indentations with said roller bearings and plate springs located in said indentations, a forward and backward regulating device 15, said cam clutch with said roller bearing plate, springs, forward and backward regulating device assembled therein being disposed inside said fly-wheel 23, a first union gear 20 at the center of said cam clutch, a second union gear 19 disposed within and engaged with said second union gear 19 a propulsion and speed change bar 12 having said second union gear 19 mounted on the axis of rotation thereof so that said cam clutch 21 and said propulsion and speed change bar 12 move together as one body, said cam clutch 21 and the bar 12 being installed with a bearing 17 for rotation on the frame axle 13, a connecting rod having one end thereof connected to one of a plurality of holes 10 on said propulsion and speed change bar 12 with a fixing pin 11, said bar having another end connected to a pin 6 movable in said hole 7 of the propulsion and speed change lever 1, and a forward and backward selector 4 connected to said forward and backward regulating device 15 with a wire.

2. The wheel chair according to claim 1 further comprising a rachet 29 on said fly-wheel 23, a pawl 30 to allow only forward movement of said fly-wheel, a stop 31 installed at the end of said pawl 30, and the end of said pawl 30 being connected to said forward and backward selector 4 with a wire to allow simultaneous operation of said pawl 30 and said forward and backward regulating device 15.

3. The wheel chair according to claim 1 wherein said cam clutch 21 has at least two of said indentations with sides inclined in opposite directions toward the center thereof, one of said plate springs 22 being installed at the center at each of said indentations with one of said roller bearings 14, said forward and backward regulating device 15 having at least two pairs of arms, each of said roller bearings 14 being confined between a different one of said pairs of arms, said arms being rotable to locate said roller bearings selectively on opposite sides of the indentations over said springs for engagement between said clutch 21 and said fly-wheel to select forward and backward propulsion.

4. The wheel chair according to claim 1 wherein said cam clutch 21 has at least two hollows spaced circumferentially from each other, a separate pair of said roller bearings in each of said hollows, a coil spring between said bearings, and said forward and backward regulating device having at least two pairs of arms circumferentially spaced from each other between which each of said separate pairs of bearings is located, for moving said pairs of bearings circumferentially in opposite senses to select forward and backward propulsion directions.

5. In a wheel chair having a frame, and wheels mounted on a shaft which is rotatably mounted on said frame for rotation about an axis, a propulsion mechanism comprising a propulsion lever pivotally mounted to said frame for back and forth motion upon actuation by the occupant of said chair, clutch means connected to said shaft, linkage means connecting said propulsion lever to said clutch means for translating the back and forth motion of said propulsion lever into rotational motion of said clutch means to drive said shaft, forward and backward motion selection means including means in said clutch means constraining said clutch means to rotate said shaft in a selected direction regardless of the sense of forward and backward motion of said propulsion lever, said propulsion lever includes speed change means for selectively changing the lever arm length between a pivot on which said lever is pivotally mounted and the connection of said linkage means to said propulsion lever, said speed change means comprises a plurality of pivoted pawls, said pawls being spaced from each other along said lever, a speed change control member moveable along said lever between a plurality of positions, spring means on said member engageable with said pawls for pivoting said pawls in different directions depending upon the position of said control member, a pin connected to said linkage, a slot extending along said lever radially away from said pivot and in which said pin is moveably disposed, said pawls being rotatable across said slot to confine said pin at the selected lever arm length, said forward and backward motion selection means comprises a control member rotatably mounted about said axis and actuable from a neutral position to either a forward or backward motion position, said clutch means having fly wheel means connected to said shaft, a clutching member rotated by said linkage means, said clutching member being freely rotatably mounted inside said fly wheel means, a coupling member moveably mounted in said clutching member between said clutching member and said fly wheel means, said constraining means comprising means on said control member for displacing said coupling member from the neutral position where it is spaced from said fly wheel means in opposite directions to respectively couple said clutching member to said fly wheel means for rotation in different opposite senses, said clutching member has a recess with surfaces at the base thereof inclined in opposite directions toward said fly wheel, said coupling member comprising a roller disposed in said recess and moveable by said control member along different ones of said inclined surfaces from the neutral position between said inclined surfaces, to selectively wedge between said clutching member and said fly wheel means depending upon the direction of rotation of said clutching member.

6. The wheel chair propulsion mechanism according to claim 5 further comprising a plate spring at the bottom of said recess on said surfaces over which said roller rolls.

7. The wheel chair propulsion mechanism according to claim 5 wherein a pair of rollers is disposed in said recess, and a coil spring between said rollers.

8. The wheel chair propulsion mechanism according to claim 5 wherein said control member comprises a ring rotatable about the axis of said chair, a pair of fingers extending axially from said ring on opposite sides of said roller for moving said roller about said shaft axis with said ring, and means operable by the occupant of said wheel chair for rotating said ring in opposite directions from the neutral position for selecting neutral, forward and backward motion of said wheel chair.

9. The wheel chair propulsion mechanism according to claim 5 wherein said linkage means includes a link connected to said clutching member and extending radially from said shaft axis, and a connecting rod pivotally mounted to said link at a location spaced from said axis and also pivotally mounted to said propulsion lever.

10. The wheel chair propulsion mechanism according to claim 9 wherein a plurality of said locations to any of which said rod can be pivotally connected is provided.

11. The wheel chair propulsion mechanism according to claim 5 further comprising a ratchet wheel connected to said fly wheel means, a pawl engageable with said ratchet wheel to enable said ratchet wheel and said fly wheel to rotate in only one direction, and means connected to said pawl and operable by the occupant of said wheel chair for moving said pawl out of engagement with said ratchet wheel.

12. The wheelchair propulsion mechanism according to claim 5 wherein said clutch means comprises a driven wheel connected to said shaft, a drive wheel coaxial with said driven wheel and connected to said propulsion lever, said drive wheel and driven wheel respectively having inner and outer peripheral surfaces which are opposed to and spaced from each other, at least one clutching member movable along said peripheral surfaces and disposed therebetween, said selection means including a motion direction selection member coupled to said clutching member for moving said clutching member in opposite directions along said surfaces, and means including said surfaces and said motion selection member for wedging said member between said surfaces for transferring torque between said drive and driven wheels and thence to said shaft only when said driven wheel is rotated in the direction to drive said shaft in the selected direction clutching.

* * * * *